United States Patent [19]

Edwards

[11] 4,007,679
[45] Feb. 15, 1977

[54] PRESS AND SAFETY LATCH THEREFOR

[75] Inventor: Bobbie Lee Edwards, Cincinnati, Ohio

[73] Assignee: Cincinnati Milacron, Inc., Cincinnati, Ohio

[22] Filed: Mar. 22, 1976

[21] Appl. No.: 669,209

Related U.S. Application Data

[63] Continuation-in-part of Ser. No. 615,351, Sept. 22, 1975, Pat. No. 3,981,671.

[52] U.S. Cl. .............................. 100/53; 100/231; 100/295; 192/129 R; 425/153; 425/409; 425/411
[51] Int. Cl.[2] ........................................ B30B 1/32
[58] Field of Search ............. 100/53, 99, 231, 295; 425/151, 153, 409, 411, 451.9; 192/129 R, 129 A, 129 B

[56] References Cited

UNITED STATES PATENTS

| | | | |
|---|---|---|---|
| 1,869,895 | 8/1932 | Hazenfield | 192/129 R |
| 2,240,630 | 5/1941 | Stacy | 100/53 X |
| 2,629,318 | 2/1953 | Schultz | 100/231 |
| 2,837,992 | 6/1958 | Wissman | 100/231 |
| 3,359,598 | 12/1967 | Bucy | 100/53 X |

Primary Examiner—Billy J. Wilhite
Attorney, Agent, or Firm—Daniel P. Worth

[57] ABSTRACT

A press mechanism that is powered by hydraulic, electrical and/or pneumatic means is provided with an improved ratchet and pawl machine which acts as a fail-safe device should any of the power means fail to lock the press parts in place. The fail-safe device includes a ratchet in the form of a circular or arcuate segment mounted with its circular center substantially coaxial with one of the turning parts of the mechanism or press, a pawl having a single tooth and a circular arcuate peripheral part that acts as a journal bearing and which in turn is supported by a pawl bearing which in turn is secured to a stationary part of the mechanism and has an arcuate journal which receives and supports the pawl therein. Tremendous load carrying capacity is thus achieved because of the large bearing area provided by the pawl bearing and the positioning of the respective ratchet and pawl teeth to employ a surface rather than point contact. An advantage of this structure is that the ratchet does not have to be backed off in order to move or continue moving one part of the mechanism.

17 Claims, 9 Drawing Figures

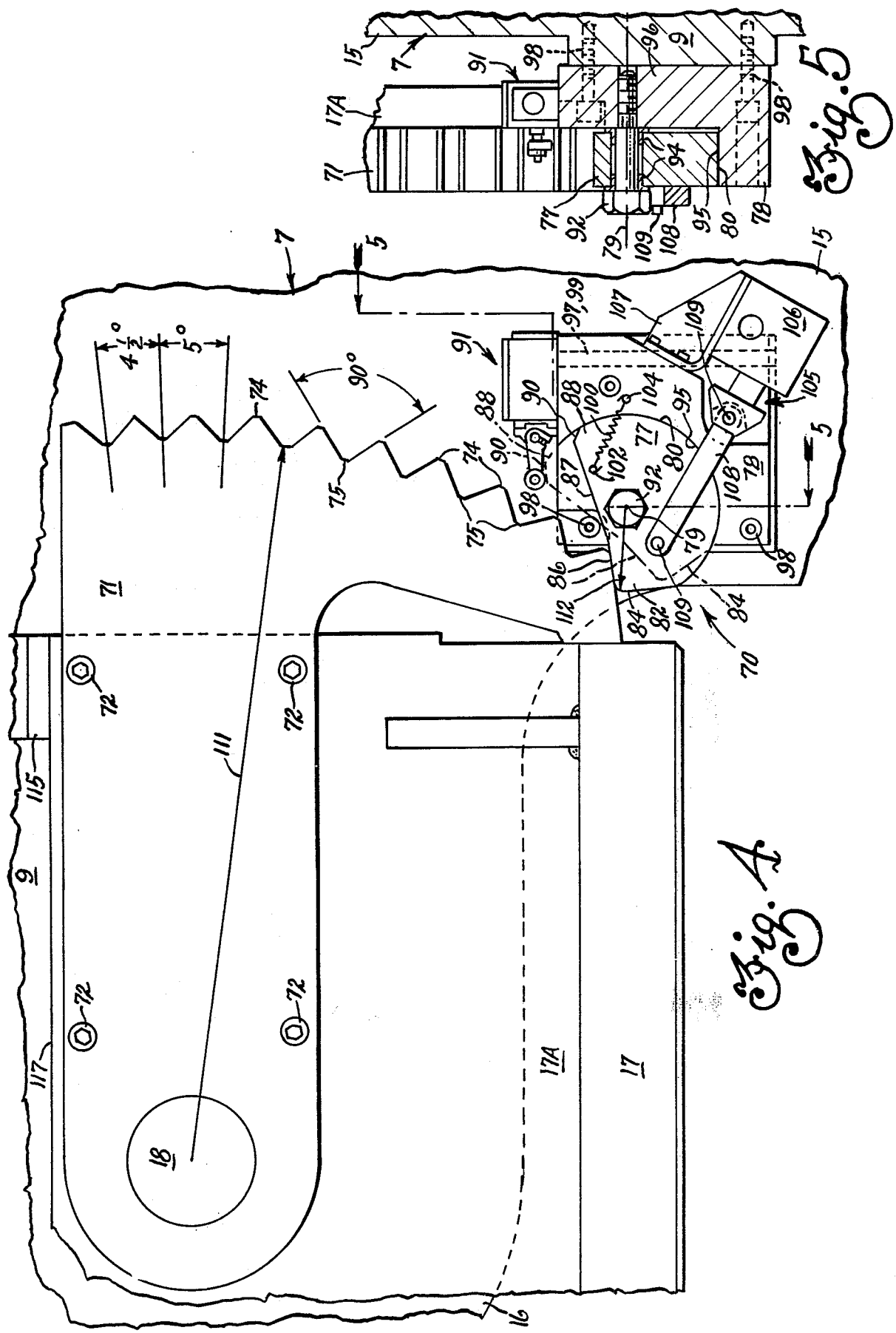

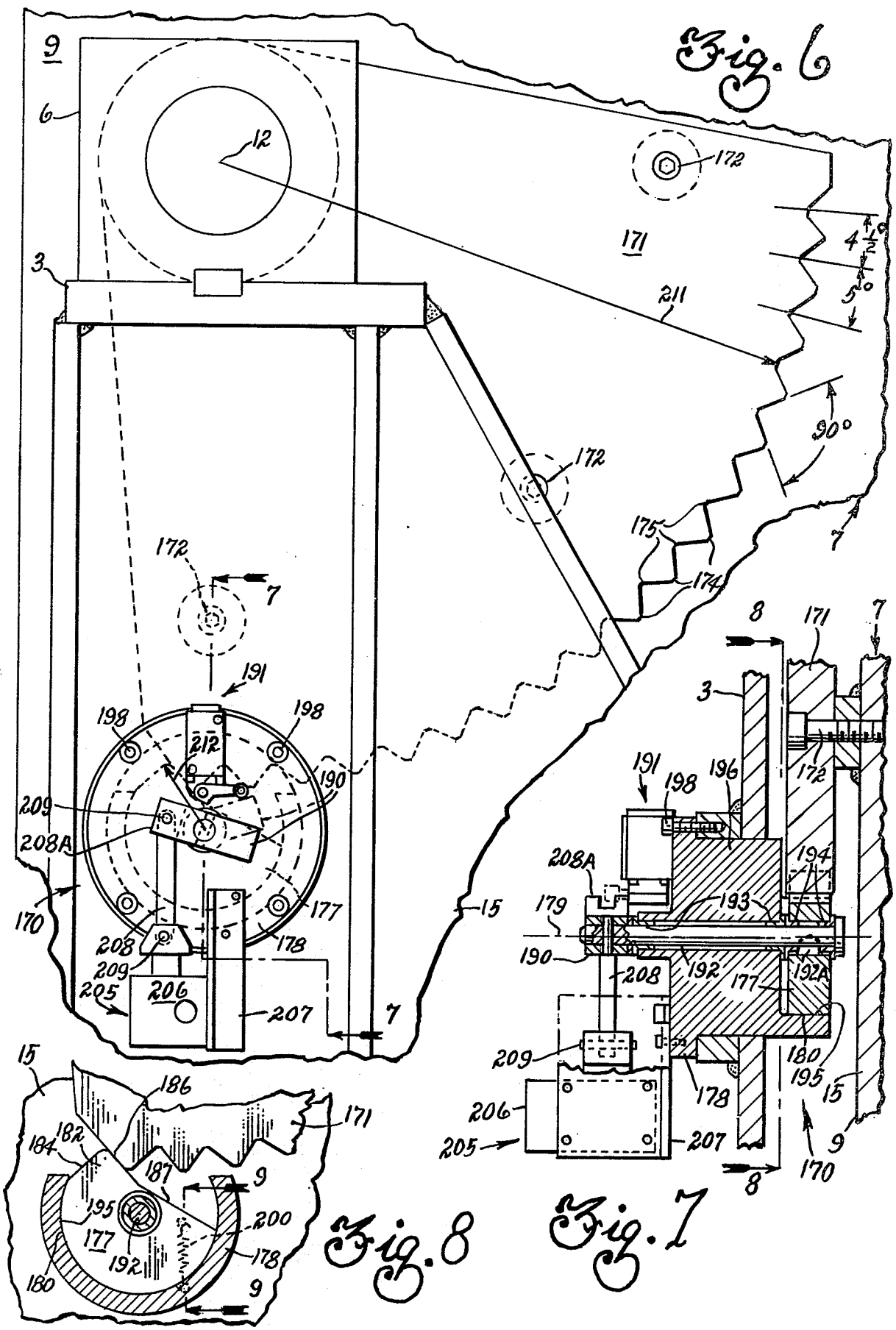

PRESS AND SAFETY LATCH THEREFOR

This is a continuation-in-part of application Ser. No. 615,351, filed Sept. 22, 1975 now U.S. Pat. No. 3,981,671.

SUMMARY AND BACKGROUND OF INVENTION

The present invention relates to an improved press and safety latch means therefor. One aspect of the invention is to provide safety latch means of high load carrying ability as fail-safe means in a press mechanism to guard against failure of power such as derived from hydraulic, electrical, or pneumatic sources or the like. An aspect is to provide an improved press having one or more safety latches such as this incorporated therein. The invention will now be described with reference to a press or clamp of the sort generally described in my above noted pending application, that is, one adaptable for use in liquid reaction molding and having a C-shaped frame assembly that is swingable with reference to a pedestal and base plate assembly, the C-shaped assembly, in turn, having a crown or upper mold support pivotally mounted in the upper jaw of the C-shaped frame.

A clamp or press of the type here described has hydraulic piston and cylinder combinations for use as its power means whereby to turn the C-shaped frame relative to the pedestal and whereby to turn the crown or upper mold support platen in a pivotal manner relative to the C-shaped frame. Loss of hydraulic pressure, failure of electrical utilities which may be pumping the hydraulic liquid up to the needed pressure, or failure of other utilities such as compressed air or the like may cause the moving parts of a press such as this to stop operation. Further, in the absence of restraining means, the press parts may return rapidly to a home position. Where the return to home is unintentional such as caused by power loss or the like, a safety hazard exists. The very mass of such clamp or press parts is so great that a mechanically positive safety latch means is deemed necessary to protect the operator or other persons who may be in the vicinity.

A fail-safe device against power failure on a clamp or press of the nature contemplated has severe service conditions which it must meet. For example, the present system has been applied to a 75 ton clamping force press (clamp) where a mold half may weight about 7 and ½ tons and be moved with its center of gravity about a radius of 1.5 – 2.7 feet. This is an enormous torque which must be controlled to provide maximum safety. As another example, the C-shaped frame member (further described in my co-pending application and below) may weigh about 15 tons and have mold halves weighing approximately 15 tons, totalling a 30 ton weight being swung about a radius of 1–1.5 feet which also requires control of this large torque in a positive fashion. Such control would -- and herein does -- arrest the return to home position under natural forces, e.g. gravity.

A safety latch comprising a mechanical brake is a possible solution to this, but the very large torques would require an enormous brake and would be susceptible to some slippage derived from dirt and other deposits settling on the braking surfaces. Also, a mechanical brake relies on friction rather than a mechanical block.

Another prior art stopping means consist in a shot pin or detent device. Such devices have a number of defects such as requiring moving the shot pin in and out of a hole every time the mechanism brings the pin and hole into conjunction which requires additional mechanism and inherently provides a lot of wear on the fail-safe devices.

A traditional ratchet and pawl device is not satisfactory here either because of the line contact between the pawl and the ratchet tooth or tooth space which it engages. My invention, among other things, aligns the pawl with the ratchet tooth space so that area contact is achieved. Also, the tremendous tonnages are successfully coped with by providing the pawl with a unique type of journal bearing. And finally, the present invention needs small unlatching power and mirror backing off when reversing the direction of movement.

Thus, the invention has among its objectives, advantages, and/or features providing an improved ratchet and pawl machine used as a safety latch, i.e., as a fail-safe device, to prevent one part of a press or like mechanism from accidentally swinging to a home position (for example under the force of gravity) about a first axis and relative to another part, which machine includes -- a ratchet that is adapted to be secured in a fixed relationship to or upon the one part and having a plurality of equally spaced teeth arranged along an arc coaxial with the first axis; a pawl supported to pivot about a second axis and which is mainly peripherally defined by an arcuate bearing surface coaxial with the second axis, a pawl tooth connected to one end of said bearing surface, and a neutral surface connecting the other end of said tooth with the other end of said bearing surface, the tip of the tooth being at a radius from the second axis less than the radius of the arcuate bearing surface; and a pawl bearing for said pawl and which is fixedly secured to the other part mentioned above and has an arcuate concave bearing surface so shaped and sized as to revolvably receive and support the pawl arcuate bearing surface therein. The pawl bearing actually receives and revolvably supports the pawl by means of the latter's arcuate bearing surface. It is important that the sum of the ratchet tooth radius and the pawl tooth tip radius are greater than the distance between the first and second axes. A means is provided to bias the pawl tooth into engagement with a space between the ratchet teeth -- preferably a helical spring under tension is provided for this purpose.

This invention also comprehends the combination of a clamp or press with one or more such ratchet and pawl machines. In the preferred embodiment, such a combination comprises a C-shaped frame assembly that is supported by a pair of journals (trunions) to swing relative to a fixed base or support (called a pedestal assembly) and on which is mounted a pair of mold supports, the upper one of which (called a crown) is swingable with reference to the C-shaped frame. The home position contemplates that the column part of the frame be substantially vertical and the jaws thereof substantially horizontal. To this combination, the present invention brings a safety latch mechanism comprising a ratchet secured to the crown to swing therewith and a pawl secured to the C-shaped frame whereby to latch the crown relative to the frame when called upon, and further includes a similar ratchet and pawl system for latching the C-shaped frame relative to the fixed base and having the ratchet on the frame supported to swing about the trunion or journal bearings thereof and a pawl mounted on the pedestal assembly to engage the same in a safety latching manner whereby both the swinging C-shaped frame and the swinging platen or crown may be latched in place in the event of a power failure.

An object of this invention is to provide an improved fail-safe machine for incorporation in other mechanisms. An object of the invention is to provide an improved combination of a fail-safe device with a mechanism of the sort described in my co-pending application. Still another object of the invention is to provide an improved mechanism of the type described in my co-pending application having a plurality of these fail-safe devices placed thereon to control displacement of the elements should power failure occur.

Other objects, advantages and features will become apparent from a reading of the following description together with the accompanying drawings wherein:

FIGS. 4 and 5 are respective enlarged views of the ratchet and pawl machine or safety latch as applied to the crown according to the invention as viewed from the side (as in FIG. 1) and end (along 5—5 of FIG. 4);

Figure 2:
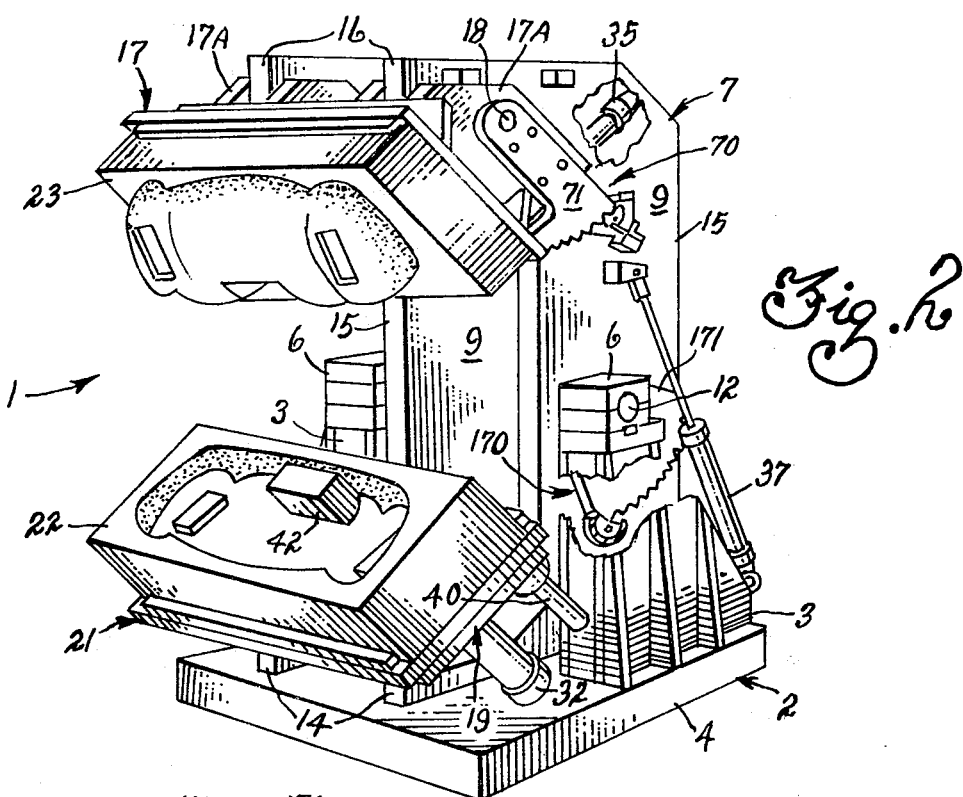
FIG. 2 is a perspective view of a press or clamp of FIG. 1 with the mold open and swung to the full daylight position illustrating with cutaway portions for clarity the position of the fail-safe machine of the present invention.
Figure 1:
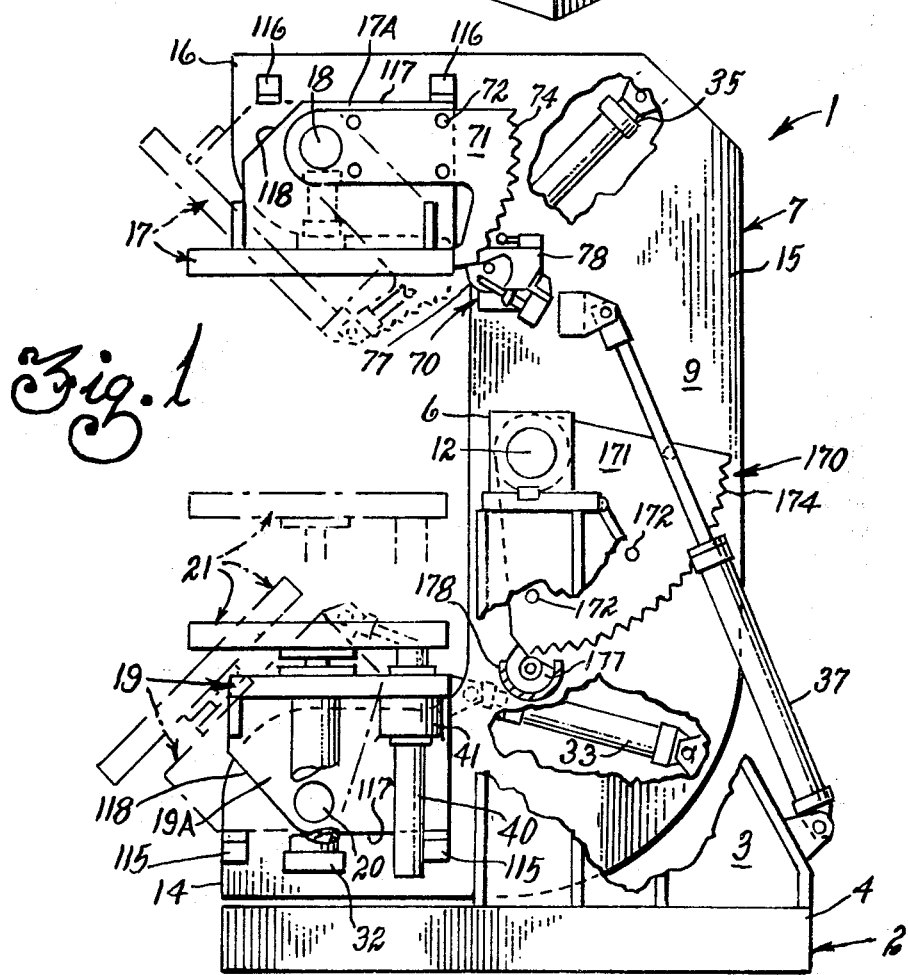
FIG. 1 is a partly cutaway side view of the press with the mold parts removed and illustrating the crown, base, and platens in solid lines and also showing in ghost lines the extreme positions to which the crown, base, and platen may be moved.
Figure 9:
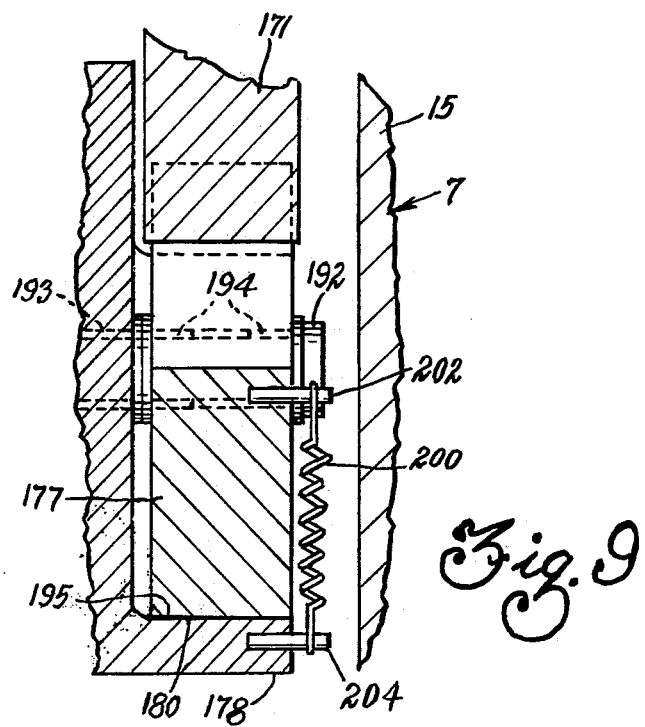

FIGS. 6 and 7 are enlarged views from the side (as in FIG. 1) and front (along 7—7 of FIG. 6) of the clamp of FIG. 1 and 2 illustrating the application of the instant safety latch to the C-frame and the elements associated therewith;

FIG. 8 illustrates a preferred form of the pawl bearing as viewed on 8—8 of FIG. 7; and FIG. 9 is a section through 9—9 of FIG. 8.

As a matter of convenience, the reference numbers used in FIGS. 1 and 2 of my co-pending application are identical with those used herein for the same parts. As a matter of simplicity and to avoid confusion, I will employ reference numbers beginning with 70 to designate the parts of the safety latch machine described herein.

As a matter of nomenclature, I refer to the safety latch assembly of the present invention as a "machine" and to the device or devices into which it is incorporated, such as the press or clamp described in FIGS. 1 and 2 as a "mechanism."

Figure 3:
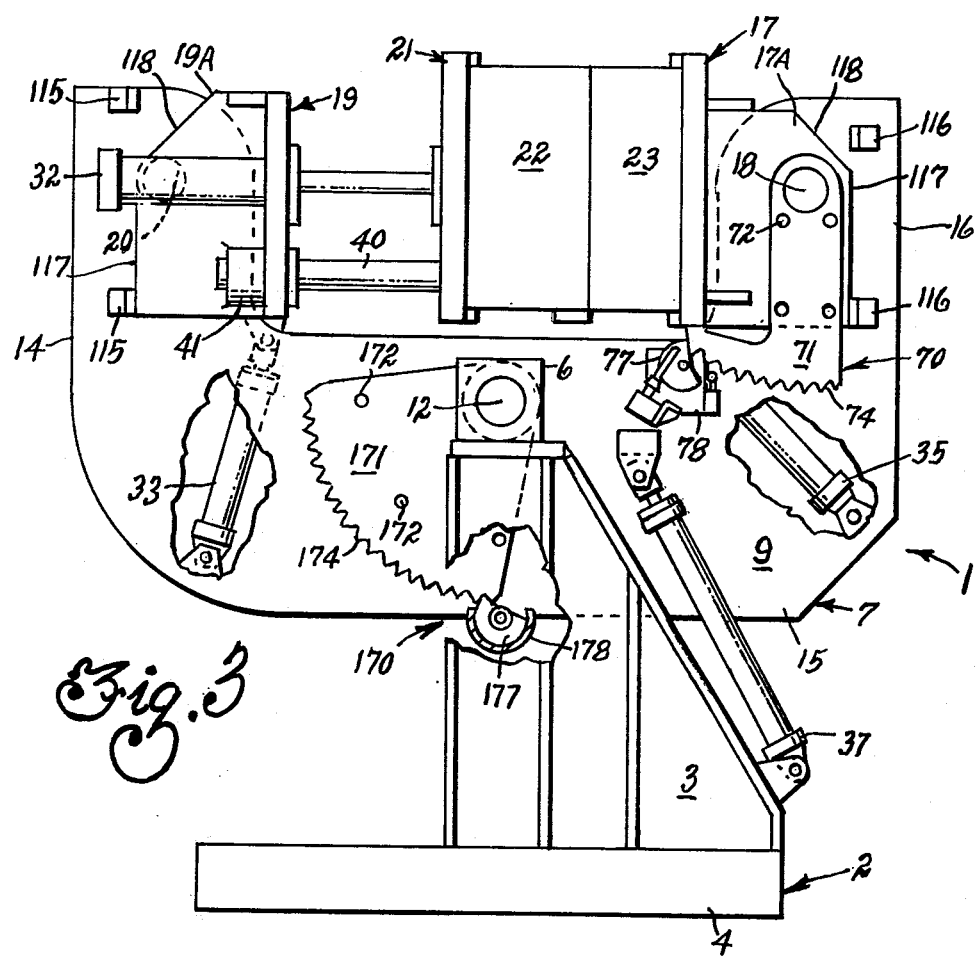
FIG. 3 is side view similarly cutaway of the press of FIGS. 1 and 2 with the mold closed, the C-frame swung 90°; and the safety latches engaged.

Referring now to the drawings, but most particularly to FIGS. 1–3, there is shown a clamp mechanism 1 according to the invention which includes a pedestal and floor plate assembly 2 which is bolted to the ground or other horizontal surface and which includes a pair of spaced apart vertical supports 3,3 of approximately triangular shape which are welded at their lower ends to a floor plate 4. At the upper end of each support 3 is a trunion or journal bearing 6,6 which supplies a means from which the C-shaped frame assembly 7 is revolvably supported between the two pedestals.

The C-shaped frame assembly 7 has a pair of C-shaped side members 9,9 supported in spaced apart relationship by a plurality of cross plates or pieces (not shown here for clarity, see cross plate 10 in my said copending application) extending laterally of the machine and generally parallel to the axis 12 common to the aforesaid trunions. Each side member 9 has a lower jaw 14 connected by a column 15 to an upper jaw 16. A mold crown 17 (swinging platen) is pivotally mounted by brackets 17A on journal bearings 18 to the upper jaw 16 of said frame assembly. A mold bed 19 is pivotally mounted on its brackets 19A by journal 20 on the lower jaw 14 of the frame assembly. A movable platen 21 is reciprocably mounted on one of said bed or crown, preferably (as illustrated) on the bed. Journal bearings 6, 18 and 20 preferably have substantially parallel axes.

Lower and upper mold segments 22,23 are secured to the platen 21 and crown 17 in such a manner as to properly engage each other when the molds are closed. The supports 3 and C-frame 7 are shaped so that the molds 22,23 are not obstructed by the supports or other parts of the base assembly 2.

A plurality of independently operated mechanism power means 30...38 are provided to move the different parts of the clamp. Preferably, these power means are double acting hydraulic piston and cylinder assemblies. The power means can be operated individually by the operator or alternatively the hydraulic liquid circuit can be provided with appropriate means to permit automatically operating the clamp through its sequence.

A plurality of hydraulic clamping cylinders 30,31,32 are secured to the bed 19 and act as power means for reciprocating the movable platen 21 relative to the bed, the pistons being connected to the platen. The alignment of the platen with the bed is maintained during reciprocation by a plurality of platen guide rods 40 which are fixedly secured to the platen and slide in corresponding bearings 41 in the bed. Cylinders 30,31,32 are preferably simultaneously operated and symmetrically disposed.

The bed and crown are revolved relative to the C-shaped frame assembly by pairs of hydraulic cylinders 33,34 and 35,36. The crown is revolved between the exteme position shown in solid and ghost lines of FIG. 1 by a pair of crown hydraulic cylinders 35,36 which are pivotally secured to the C-frame assembly and to the inner edge of the crown. The bed 19 (on which is mounted the movable platen 21 and lower mold half) is revolved between the FIG. 1 extremes by a pair of bed hydraulic cylinders 33,34 which are pivotally connected to the C-frame and to the inner edge of the bed.

The C-shaped frame assembly 7 is swingable about the trunions 6 from the FIG. 1 to the FIG. 3 position through a 90° arc by a pair of pedestal hydraulic cylinders 37,38 each of which is mounted pivotally at each end to the pedestal assembly and the frame assembly 7, respectively. Preferably, the vertical support plates of the pedestal are sloped or cut along their rear edge to accommodate the pedestal hydraulic cylinders. The pedestal cylinders - actually the piston thereof as illustrated -are pivotally connected to a place of the frame assembly selected so that the amount of cylinder force required is minimized in view of the moment arm and force applied by the pedestal cylinders and the counteracting center of gravity and moment arm of the frame assembly and mold.

The arrangement shown, with the moving platen 21 attached to the lower bed 19 provides a desirable safety feature whereby the platen 21 falls open in response to the loss of mold closing force thereby preventing accidental mold closing. For example, the loss of hydraulic liquid pressure would permit the platen to fall open against the bed so long as the platen is mounted on the lower one of the bed or crown.

The aforementioned pairs of hydraulic cylinders 33...38 for the bed, crown and C-frame assembly are symmetrically mounted in the manner described above and illustrated in the figures. In each pair there is a cylinder on the left side of the mechanism 1 and one on the right side of the mechanism 1. The two cylinders in each pair are preferably operated simultaneously and therefore connected in parallel.

An injection means assembly 42 (FIG. 2) is secured preferably to the lower mold half 22 so that it injects along the parting line of the mold. This allows runners and gates to be formed in both the upper and lower molds, facilitates parting, and makes it much easier to remove the molded article once the same has been cured or cooled to a solid condition.

Referring now to FIGS. 4 and 5 which show the crown safety latch 70, there is illustrated a ratchet 71 positively secured by a plurality of bolts 72 to one of the mold crown brackets 17A of swinging platen 17. The ratchet has a plurality of equally spaced teeth 74, and by the same token a plurality of substantially V-shaped tooth spaces 75 arranged along an arc which is coaxial with the journal bearings 18 about which the crown is revolvable. In the preferred illustrated embodiment, the teeth have a face angle of 90°, a straight sided tooth surface, and are spaced apart by 5° whereby the safety latch action is achieved in 5° increments. The last spacing interval optionally but preferably is 4 ½° so that no minimum back off is required as it is with the other spaces when reversing the direction of movement of the crown from clockwise to counterclockwise as viewed in FIG. 1.

A pawl 77 is mounted by means of a pawl bearing 78 to pivot about a second axis 79. The pawl itself is peripherally chiefly defined by an arcuate bearing surface 80 which is coaxial with this second axis 79, a single tooth 82 having straight sides 84,86 spaced by an angle substantially equal to the ratchet tooth spacing (preferably 90°), and a neutral surface 87 to connect the tooth with one end 88 of the arcuate bearing surface. Said one end 88 in the illustrated embodiment also has a cam surface 90 for operating a limit switch 91 which is used to signal visually or audibly when the pawl 77 has been moved to an extreme position (shown in dotted lines) by the passage of a ratchet tooth 74.

The pawl 77 is held in position by a small bolt 92 that screws into the pawl bearing 78 (FIG. 5) and/or the column portion 15 of the C-frame as shown in FIG. 5. A resilient journal bearing 94 of material such as nylon is provided as a bearing liner between bolt 92 and the pawl 77. The mechanical fit between the bolt 92, liner 94 and pawl 77 is such that when the pawl is loaded by engaging the ratchet, (as in FIG. 1 dotted lines) the arcuate surface of the pawl moves slightly and comes into a bearing relationship with the correspondingly shaped and sized arcuate bearing surface 95 on the pawl bearing 78 whereby the pawl is received and supported when under load in the pawl bearing 78. The pawl bearing 78 itself as shown in FIGS. 4, 5 consist in a base plate 96 (FIG. 5) a key 97 (FIG. 4) preferably integral with the base plate and a cut out portion on one corner of the base plate which provides the arcuate bearing surface 95 of the pawl bearing. A plurality of bolts 98 secures the pawl bearing 78 in position on the column 15 portion of the C-shaped frame 7. A slot 99 in frame 7 receives the key.

Still referring to FIGS. 4, 5 the safety latch machine further includes a means to constantly bias the pawl into engagement with the ratchet, preferably a helical spring 100 held under tension between a first pin 102 fixed in the pawl and a second pin 104 fixed in the bearing 78.

There is a machine power means 105 to disengage the pawl from the ratchet 71 preferably powered by an electrical solenoid 106 which is mounted on a bracket 107 adjacent to or on the pawl bearing. A connecting rod 108 secured by a pin 109 at each end to the pawl and moving solenoid member respectively, serves to transmit motion and to disengage the pawl when the solenoid is actuated.

Preferably the parts are so constructed and arranged that when the pawl is engaged with a ratchet tooth, the surface of the ratchet tooth and the pawl tooth are in engagement rather than having a line or point contact. Where a 5° tooth spacing and 90° tooth face angle is used, this arrangement can be achieved by having the next to last tooth space centered 2° above horizontal and the forward face 84 of the pawl 7° off vertical as illustrated.

With the above mechanism, a positive mechanical fail-safe locking engagement is achieved with the embodiment of FIGS. 4, 5 when the sum of the ratchet root radius 111 from axis 18 to the bottom of each tooth space 75 and of the pawl tooth tip radius 112 from its axis 79 is greater than the distance between the axis of journal 18 and the axis 79 about which the pawl 77 rotates, and similarly for to corresponding parts of the FIGS. 6–9 embodiment.

Pairs of stops 115, 116 are welded to the frame lower jaw 14 and upper jaw 16, respectively, to define the extreme motion limits of the lower and upper platens 19,17 by mechanically engaging the lower/upper ends 117 and cutaway (or oblique) front ends 118, respectively, of one of the platen brackets 19A,17A.

The frame safety latch embodiment illustrated in FIGS. 6–9 is essentially like that already described for FIGS. 4, 5, regarding the crown safety latch. The differences between the two are primarily a physical relocation of parts made necessary by the arrangement of other elements of the press mechanism. The coaction between the several parts remains the same, however.

The reference numbers for parts in FIGS. 6–9 have been increased by 100 over their counterparts in FIGS. 4, 5. Thus, latch 70 (4, 5) becomes latch 170 (6–9) and solenoid 106 (4, 5) becomes solenoid 206 (6–9).

Referring now to FIGS. 6–9 which show the frame safety latch 170, there is illustrated a ratchet 171 positively secured by a plurality of bolts 172 to the frame 7. The ratchet 171 has a plurality of equally spaced teeth 174 alternating with substantially V-shaped tooth spaces 175 arranged along an arc which is coaxial with trunnions or the journal bearings 6 about which the frame is revolvable. In the preferred embodiment, the teeth have a face angle of 90°, a straight sided tooth surface, and are spaced apart by 5° whereby a stopping action can be achieved in 5° increments. The last spacing interval is, preferably, 4 ½° so that no minimum back off is required as it is with the others when reversing the direction of movement of the frame from clockwise to counterclockwise as viewed in FIG. 1.

A pawl 177 is revolvably supported by means of a pawl bearing 178 on pedestal 3 to pivot about a second axis 179. The pawl itself is peripherally chiefly defined by an arcuate bearing surface 180 which is coaxial with this second axis, a single tooth 182 having straight sides 184, 186 spaced by an angle substantially equal to the ratchet tooth spacing (preferably 90°), and a neutral surface 187 to connect the tooth with one end of the arcuate bearing surface. Said one end in the illustrated embodiment does not have a cam surface like 90 but instead (as illustrated in solid and dotted lines FIG. 6) has a cam block 190 secured to the bolt or shaft 192 for operating limit switch 191 which is used to indicate or sound an alarm when the pawl 177 has been moved to an extreme position by the passage of ratchet 171.

The pawl is secured by a key 192A to shaft 192 that passes through pedestal 3 to where it connects to the solenoid 206 as described below and as shown in FIG. 6. A resilient journal bearing material such as nylon is provided as bearing liners 194 between the shaft 192 and pawl 177. The mechanical fit between the bolt or shaft 192, liners 194, and pawl 177 is like that for the crown safety latch machine -- such that when the pawl is loaded by engaging the ratchet, the arcuate surface 180 of the pawl moves radially into a bearing relationship with the correspondingly shaped and sized arcuate bearing surface on the pawl bearing whereby the pawl is received and supported when under load in the pawl bearing.

Bushings 193 revolvably support the remainder of shaft 192 from the bearing 178. The pawl bearing 178 itself as best seen in FIGS. 8, 9 is shaped like a flanged bushing and has a base plate 196 secured by bolts 198 to a circular raised boss welded to the pedestal 3.

Referring to FIGS. 8, 9 the safety latch mechanism further includes a means to constantly bias the pawl into engagement with the ratchet, preferably a helical spring 200 held under tension between a first pin 202 fixed in the pawl and a second pin 204 fixed in the bearing.

In FIGS. 6, 7 is a means 205 to disengage the pawl from the ratchet, preferably driven by electrical solenoid 206 which is mounted on a bracket 207 adjacent to or on the pawl bearing. A connecting rod 208, secured by a pin 209 at each end to the pawl and moving solenoid member respectively, serves to transmit motion to the pawl via crank 208A and shaft 192 and to disengage the pawl when the solenoid is actuated as seen in FIG. 6 cam block 190 and crank 208A are an integral unit. Due to space limitations the shaft 192 is used to position the solenoid outside the pedestal so that the frame 7 can swing unobstructedly inside and to facilitate assembly, inspection, and service.

The parts are so constructed and arranged that when the pawl 177 -- actually pawl tooth 182 -- is engaged with a ratchet tooth space 175 the surface of the ratchet tooth and the pawl tooth are in engagement rather than having a line or point contact. When a 5° tooth spacing and 90° tooth face angle is used, this arrangement can be achieved by having the next to last tooth space centered 2° above horizontal and the forward face of the pawl 7° off vertical as illustrated.

With the above mechanism, a positive mechanical fail-safe locking engagement is achieved when the sum of the ratchet root radius 211 (to the bottom of each tooth space) and the pawl tooth tip radius 212 is greater than the distance between the axis of journal 6 and the axis about which the pawl rotate, which happens to be the axis and through bolt 192.

Machine power means 105, 205 preferably comprise a pneumatic cylinder or may comprise an electrical solenoid. Because of the design of this system and the need for minimal backing off power, such machine power means may be of a low power output, for example, a torque of about 50 in. lb. is used in unlatch the fail-safe machine described above for the 75 tons (150,000 pounds) clamping force device having a mold (i.e. halves) weighing up to 15 tons. Of course, the mechanism power (e.g. cylinders 35,36 or 37,38) is first selectively or manually operated by the operator in order to back off the ratchet and disengage them.

If the mechanism has failed, e.g. hydraulic system leak or failure, a suitable correction has to be made before backing off and homing and the present invention can hold the parts in place until such correction is made.

Upon disengagement of the pawl tooth from the ratchet, the machine parts can be moved to their home position, the crown 17 and mold 23 mounted thereon for example will swing to the horizontal position shown in solid lines in FIG. 1 and the C-frame 7 will swing under the influence of gravity from the position illustrated in FIG. 3 to the solid line vertical position of FIG. 1. Bed 19 is so balanced as to move to the FIG. 1 solid line position when the C-frame is vertical as in FIG. 1.

What is claimed is:

1. An improved ratchet and pawl machine to prevent one part of a press or like mechanism from accidentally swinging to a home position about a first axis and relative to another part, which machine comprises
    a ratchet adapted for securing in fixed relation to said one part and having a plurality of equally spaced teeth arranged along an arc that is coaxial with said first axis;
    a pawl adapted for pivoting about a second axis and which is peripherally mainly defined by an arcuate bearing surface coaxial with said second axis, a tooth, and a neutral surface, the tip of said tooth being at a radius from said second axis less than the radius of said arcuate bearing surface; and
    a pawl bearing for said pawl and which is fixedly secured to said another part and has an arcuate bearing surface shaped and sized to receive the pawl arcuate bearing surface;
    said pawl bearing receiving said pawl arcuate bearing surface and supporting said pawl to revolve about said second axis with its tooth located to engage the teeth on said ratchet;
    the sum of the ratchet root radius and the pawl tooth tip radius being greater than the distance between said first axis and said second axis.

2. A machine according to claim 1, further comprising:
    bias means to urge said pawl tooth into engagement with the space between said teeth.

3. A machine according to claim 2, wherein said bias means is a spring mounted to constantly urge as aforesaid.

4. A machine according to claim 2, further comprising machine power means to withdraw said pawl tooth out of engagement with said ratchet against the urging of said bias means.

5. A machine according to claim 2, further comprising a machine power means that includes an electrical solenoid connected between said pawl and said another part to withdraw said pawl tooth out of engagement with said ratchet when energized.

6. A machine according to claim 2, further comprising a machine power means that includes an pneumatic cylinder connected between said pawl and said another part to withdraw said pawl tooth out of engagement with said ratchet when energized.

7. A machine according to claim 1, further comprising machine power means to disengage said pawl tooth out of engagement with said ratchet.

8. A mechanism that includes the ratchet and pawl machine of claim 1 and further comprises mechanism power means to turn said one part about said first axis relative to said another part and toward and away from a home position.

9. A mechanism according to claim 8, wherein said mechanism power means is a double acting hydraulic cylinder.

10. A mechanism according to claim 8, wherein said another part remains stationary and supports the other elements recited so that said one part is moved against gravity when turned by said mechanism power means about said first axis in a direction away from home and so that gravity would cause the return of said one part to a home position were the said mechanism power means to fail and were said ratchet and pawl machine absent.

11. A mechanism according to claim 8, further comprising
bias means to urge said pawl tooth into engagement with the space between said teeth.

12. A mechanism according to claim 11, further comprising
machine power means to withdraw said pawl tooth out of engagement with said ratchet against the urging of said bias means.

13. A clamp or press that constitutes the mechanism according to claim 8, wherein said one part comprises a swingable frame assembly having trunions upon which such assembly is revolvably supported, said first axis is generally horizontal and extends though said trunnions, said another part is a pedestal and floor plate assembly that revolvably receives said trunnions, the home position is that assumed when the frame is permitted freely to swing about said axis to a predetermined position at one end of the arc through which said frame has swung, and wherein said pawl bearing is fixed to said pedestal.

14. A clamp or press that constitutes the mechanism according to claim 8 wherein said one part comprises a swingable platen suitable for mounting a mold thereon and having journals upon which such platen is revolvably supported, said first axis being generally horizontal and extending through said journals, said another part is a frame assembly that revolvably receives said journals, the home position is that assumed when the platen is permitted freely to swing about said axis to a position at one end of the arc through which said platen has swung and wherein said pawl bearing is fixed to said frame.

15. An improved machine according to claim 1, wherein said pawl is revolvably secured on center by a pin member into said another part around which pin is a resilient journal member there being sufficient pin to pawl play and resilience of said journal bearing to allow said pawl bearing surface to engage the mating surface on said pawl bearing.

16. An improved machine according to claim 1, wherein said pawl bearing has a key formed integrally therewith and located with a longitudinal dimension approximately normal to the force received on the pawl bearing from said ratchet when the pawl tooth is engaged with said ratchet.

17. An improved machine according to claim 1, wherein said ratchet teeth are substantially straight sided and are spaced apart by substantially V-shaped spaces arranged along said arc and said pawl tooth is substantially straight sided and has an included angle substantially that of each said space whereby surface to surface engagement of the pawl tooth and ratchet tooth areas is facilitated.

* * * * *